US010007365B2

United States Patent
Sun et al.

(10) Patent No.: US 10,007,365 B2
(45) Date of Patent: Jun. 26, 2018

(54) ELECTRONIC APPARATUS, DISPLAY DEVICE AND DISPLAY CONTROL METHOD FOR ROTATING DISPLAY CONTENT WHEN SHARING

(71) Applicant: Lenovo (Beijing) Co., Ltd., Beijing (CN)

(72) Inventors: Bingchuan Sun, Beijing (CN); Bin Li, Beijing (CN)

(73) Assignee: LENOVE (BEIJING) CO., LTD., Haidian District, Beijing (CN)

(*) Notice: Subject to any disclaimer, the term of this patent is extended or adjusted under 35 U.S.C. 154(b) by 164 days.

(21) Appl. No.: 14/638,382

(22) Filed: Mar. 4, 2015

(65) Prior Publication Data

US 2016/0171660 A1   Jun. 16, 2016

(30) Foreign Application Priority Data

Dec. 15, 2014 (CN) .......................... 2014 1 0778973

(51) Int. Cl.
*G06F 3/01* (2006.01)
*G06F 3/041* (2006.01)
(Continued)

(52) U.S. Cl.
CPC .......... *G06F 3/041* (2013.01); *G02B 15/00* (2013.01); *G06F 1/163* (2013.01); *G06F 1/1639* (2013.01); *G06F 3/011* (2013.01); *G06F 3/017* (2013.01)

(58) Field of Classification Search
None
See application file for complete search history.

(56) References Cited

U.S. PATENT DOCUMENTS 7,371,163 B1 * 5/2008 Best ........................ A63F 13/10
463/1
2012/0200495 A1 8/2012 Johansson
(Continued)

FOREIGN PATENT DOCUMENTS

CN 203811898 U 9/2014
DE 10 2007 001 266 7/2008
(Continued)

OTHER PUBLICATIONS

Office Action dated Sep. 22, 2015 out of corresponding German Application No. 10 2015 103 276.7 (14 pages including English translation).
(Continued)

*Primary Examiner* — Nicholas R Wilson
(74) *Attorney, Agent, or Firm* — Brinks Gilson & Lione; John C. Freeman

(57) ABSTRACT

An electronic apparatus, a display device, and a display control method are disclosed. The electronic apparatus includes a display component for outputting an original light corresponding to a first image; an optical component configured for transforming the original light to a first exit light by conducting an optical path conversion on the original light, wherein the first exit light is capable of forming an enlarged virtual image corresponding to the first image within an imaging plane; a detection component configured for detecting whether a predetermined event occurs; and a control component configured for controlling a rotation within the imaging plane of the enlarged virtual image in the case that the predetermined event is detected by the detection component.

15 Claims, 9 Drawing Sheets

(51) Int. Cl.
  *G02B 15/00* (2006.01)
  *G06F 1/16* (2006.01)

(56) References Cited

U.S. PATENT DOCUMENTS

| | | | |
|---|---|---|---|
| 2014/0022278 A1 | 1/2014 | Guo | |
| 2014/0118825 A1* | 5/2014 | Shikii | G02B 27/2214 359/465 |
| 2014/0168210 A1 | 6/2014 | Bromer | |
| 2015/0124566 A1* | 5/2015 | Lake | G04G 21/08 368/10 |

FOREIGN PATENT DOCUMENTS

| | | | | |
|---|---|---|---|---|
| DE | 10 2010 041 344 | | 3/2012 | |
| JP | 2006-208560 A | | 8/2006 | |
| WO | WO 2012125131 A1 * | | 9/2012 | A63F 13/52 |

OTHER PUBLICATIONS

Office Action, and English language translation thereof, in corresponding Chinese Application No. 201410778973.8, dated Jul. 15, 2016, 12 pages.

Second Office Action (12 pages) dated Apr. 1, 2017 out of Chinese priority application 201410778973.8.

* cited by examiner

ELECTRONIC APPARATUS, DISPLAY DEVICE AND DISPLAY CONTROL METHOD FOR ROTATING DISPLAY CONTENT WHEN SHARING

This application claims priority to Chinese Application No. 201410778973.8 filed on Dec. 15, 2014, the entire contents of which are incorporated herein by reference.

The disclosure is related to the field of the electronic apparatus, and more particularly, to an electronic apparatus, a display device, and a display control method applied to the same.

BACKGROUND

The types of the corresponding display device and the electronic apparatus containing it are wide range of variety increasingly with the increase of a viewing demand of the user. Generally, an image viewed by the user on the display device and the electronic apparatus is a real image. However, there are new types of the display device and the electronic apparatus recently, and the image viewed by the user on the display device and the electronic apparatus is a virtual image.

Unlike the apparatus displaying a real image, the user is required to view at a particular distance/particular position in the new type of the display device and the electronic apparatus. There is a situation that other persons who are the objects for sharing commonly or individually have to be located at the same or the substantially same particular distance/particular position as that of the user in order for a viewing when the user desires to share the content commonly or individually with them, such that a variety of inconvenience is exerted on the user. For example, it is possible that the user is required to approach other persons who are the objects for sharing commonly or individually very tightly.

SUMMARY

In accordance with an aspect of the disclosure, there is provided an electronic apparatus comprising a display component for outputting an original light corresponding to a first image; an optical component configured for transforming the original light to a first exit light by conducting an optical path conversion on the original light, wherein the first exit light is capable of forming an enlarged virtual image corresponding to the first image within an imaging plane; a detection component configured for detecting whether a predetermined event occurs; and a control component configured for controlling a rotation within the imaging plane of the enlarged virtual image in the case that the predetermined event is detected by the detection component.

In accordance with another aspect of the disclosure, there is provided a display device comprising a display component for outputting an original light corresponding to a first image; an optical component configured for transforming the original light to a first exit light by conducting an optical path conversion on the original light, wherein the first exit light is capable of forming an enlarged virtual image within an imaging plane; wherein the display component or the optical component is capable of being controlled such that an rotation within the imaging plane of the enlarged virtual image is controlled in the case that the occurrence of the predetermined event is detected.

In accordance with still another aspect of the disclosure, there is provided a display control method comprising outputting an original light corresponding to a first image by a display component; transforming the original light to a first exit light by conducting an optical path conversion on the original light, wherein the first exit light is capable of forming an enlarge virtual image corresponding to the first image within an imaging plane by an optical component; detecting whether a predetermined event occurs; controlling a rotation within the imaging plane of the enlarged virtual image in the case that the occurrence of the predetermined event is detected.

DETAILED DESCRIPTION

A depiction of various implementations of the disclosure will be made with reference to the drawings below. The depiction with reference to the drawings is provided for an aid of understanding of the example implementations of the disclosure defined by the claims and the equivalences thereof. Various specific details are included therein for an assistance of the appreciation, but are considered to be exemplary merely. Hence, it is recognized by those skilled in the art that various alterations and modifications may be made on the implementations described herein without depart from the scope and spirit of the disclosure. In addition, a detailed description of the common known functions and structures in the art will be omitted for a sake of a more clear and simple specification.

Figure 1:
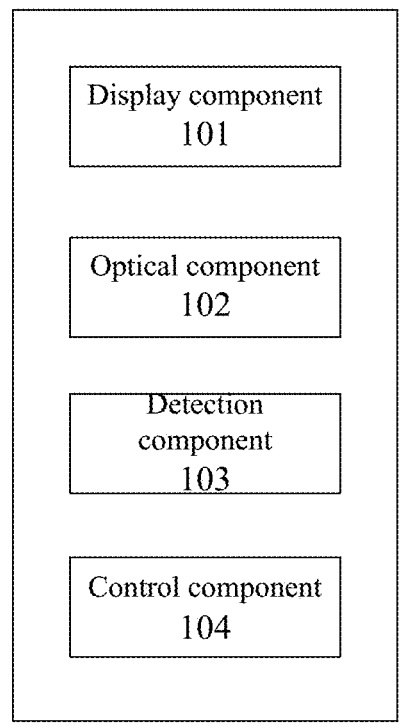
FIG. 1 illustrates a block diagram of a configuration of an electronic apparatus in accordance with the embodiment of the disclosure.

Firstly, an electronic apparatus in accordance with the embodiment of the disclosure will be described with reference to FIG. 1. FIG. 1 is the block diagram illustrating the configuration of the electronic apparatus in accordance with the embodiment of the disclosure. The electronic apparatus 100 comprises a display component 101, an optical component 102, a detection component 103, and a control component 104, as shown in FIG. 1.

The display component 101 is configured to output an original light corresponding to a first image. For example, the display component 101 herein may be a self-illumination display component, such as an organic light-emitting diode (OLED) display, and may also be a back light display component, such as a liquid crystal display.

The optical component 102 is at least partly set within an illumination region of the original light, and configured to conduct an optical path conversion from the original light corresponding to the first image originating from the display component 101 into a first exit light capable of forming an enlarged virtual image corresponding to the first image within a particular plane. For example, the optical component 102 herein may be a group of lenses for collimating and enlarging the image and a waveguide film or a flexible waveguide, etc. for changing an exit direction of the image.

The detection component 103 is configured to detect whether a predetermined event occurs. The detailed content for the predetermined event will be depicted hereinafter.

The control component 104 is configured to conduct a control such that an image corresponding to the first image is rotated by a predetermined angle in a predetermined direction within the particular plane when the predetermined event is detected by the detection component 103.

Figure 2:
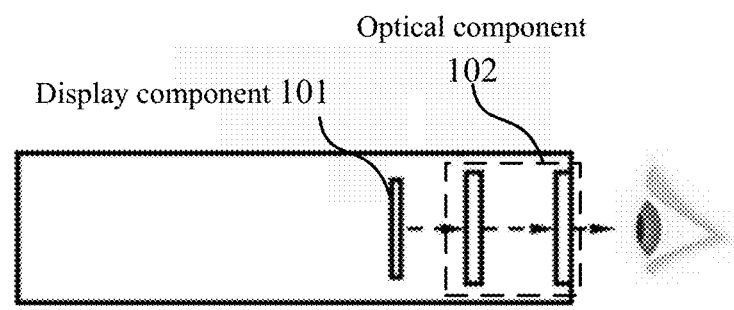
FIG. 2 is a schematic diagram illustrating a first example of layout of a display component and an optical component.

The exit direction of the original light may be the same as that of the first exit light. FIG. 2 illustrates the schematic diagram of the layout of the display component 101 and the optical component 102 in that case. The display component 101 and the optical component 102 are placed by lamination in a direction in which the content is viewed by the user, as shown in FIG. 2. In that case, macroscopically, the exit direction of the original light is the same as that of the first exit light: each of which is the direction from the display component to the user (the direction from the left to the right in FIG. 2). Particularly, in FIG. 2, the display component 101 may be a micro display, and the optical component 102 is formed from a group of lenses. An enlarged virtual image corresponding to the first image displayed by the display component 101 is formed by the group of lenses.

Figure 3:
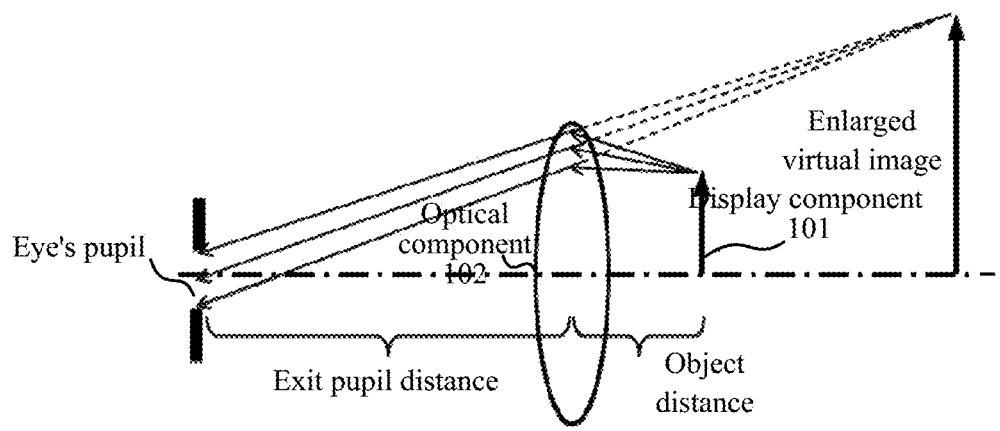
FIG. 3 is a principle diagram illustrating a near-eye optical display when the display component and the optical component are placed in a position relationship shown in FIG. 2.

FIG. 3 is a principle diagram illustrating a near-eye optical display when the display component 101 and the optical component 102 are placed in the position relationship shown in FIG. 2. The light ray emitted by the display unit 101 corresponding to the image displayed thereby is received via the optical component 102, such as the group of lenses, and subjected to a corresponding optical path conversion, as shown in FIG. 3. As a result, the light ray after the optical path conversion is directed into the pupils of the viewer, forming the enlarged virtual image.

Figure 4:
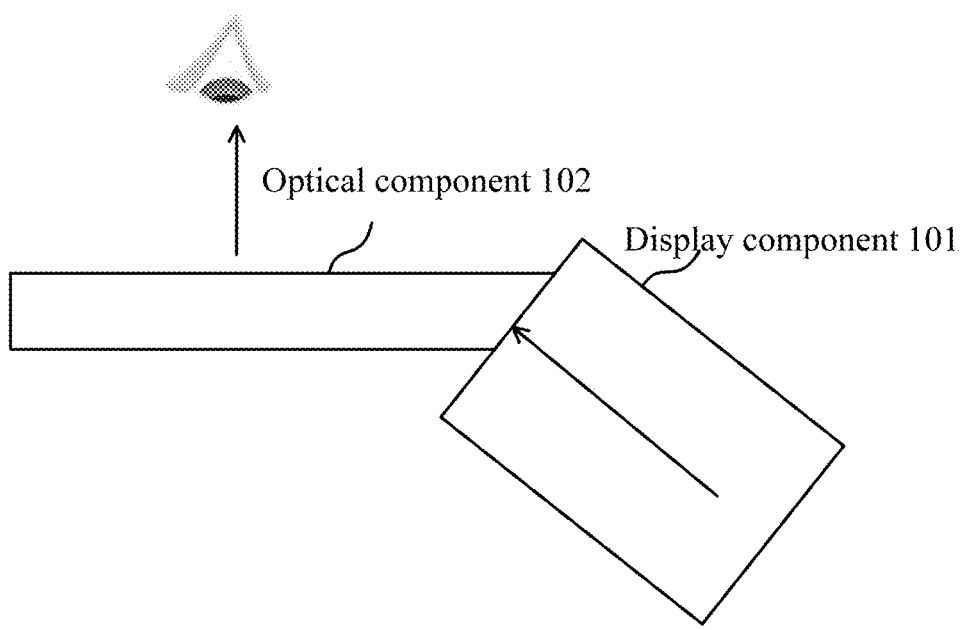
FIG. 4 is a schematic diagram illustrating a second example of layout of the display component and the optical component.

In addition, alternatively, the exit direction of the original light may be different from that of the first exit light. FIG. 4 illustrates the schematic diagram of the layout of the display component 101 and the optical component 102 in that case. There is a particular angle between the exit direction of the original light and that of the first exit light, as shown in FIG. 4. In one preferred embodiment of the disclosure, the angle is 90 degrees. For example, the display component 101 and the optical component 102 may be implemented by an optical engine module. The module consists of a light-guide optical element (LOE) and a micro display screen pod (POD). Wherein, the light-conductive optical element (LOE) and the micro display screen pod (POD) correspond to the optical component 102 and the display component 101, respectively. The image is projected directly onto the LOE by the micro display screen pod (POD).

Figure 5:
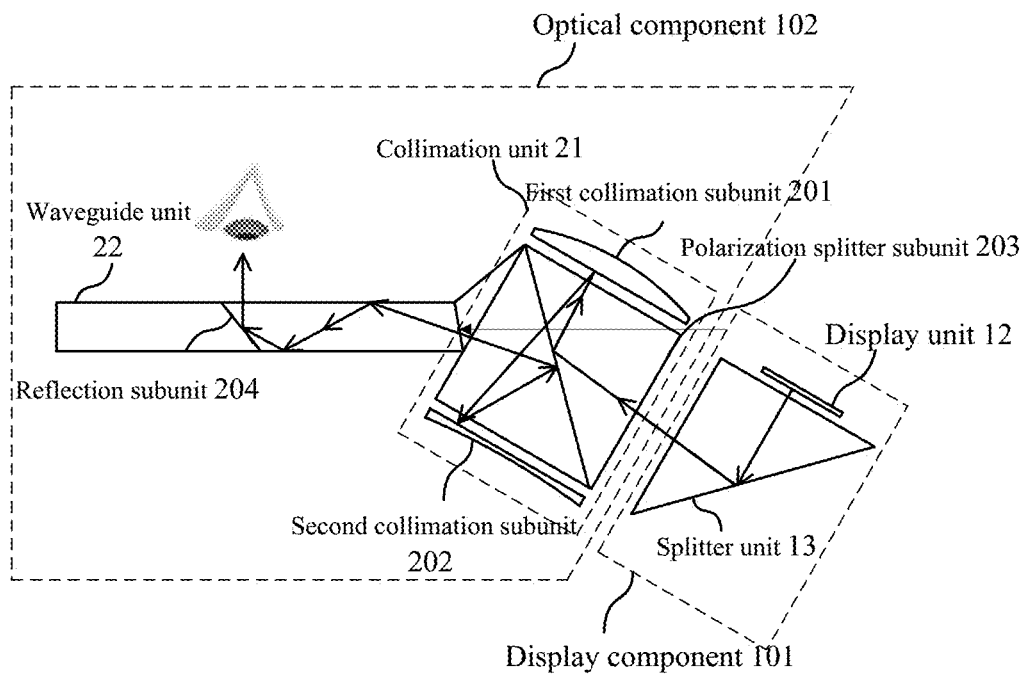
FIG. 5 is a principle diagram illustrating a near-eye optical display when the display component and the optical component are placed in a position relationship shown in FIG. 4.

FIG. 5 is the principle diagram illustrating the near-eye optical display when the display component 101 and the optical component 102 are placed in the position relationship shown in FIG. 4. The optical component 102 further comprises a collimation unit 21 and a waveguide unit 22. The collimation unit 21 is configured to collimate the original light corresponding to the first image originating from the display component 101 to a collimated light ray corresponding to the first image and guide it into the waveguide unit 22. Particularly, the collimation unit 21 comprises a first and a second collimation subunits 201, 202 arranged oppositely as well as a polarization splitter subunit 203 arranged there between, and the light ray corresponding to the first image originating from the display component 101 is reflected originally towards the first collimation subunit 201 via the polarization splitter subunit 203, and then exited as the collimated light ray corresponding to the first image via the polarization splitter subunit 203 after being collimated via the first and the second collimation subunits 201, 202. The collimated light ray corresponding to the first image from the collimation unit 21 is guided to the particular position by the waveguide unit 22, wherein the collimated light ray corresponding to the first image is utilized to form a virtual image corresponding to the first image. In one preferred embodiment of the disclosure, the first and the second collimation subunits 201, 202 may be a single lens or a group of lenses designed in accordance with the requirement. A size adjustment of the virtual image corresponding to the first image may be realized by adjusting the relative position of the lens or the group of lenses configuring the first and the second collimation subunits 201, 202.

In addition, the waveguide unit 22 further comprises a reflection subunit 204, the position and the angle of which may be set to control the collimated light ray corresponding to the first image from the collimation unit 21 to be guided to exit at the particular position, as shown in FIG. 5. The collimation unit 21 and the display component 101 are on the same side with respect to the plane in which the waveguide unit 22 is located, and may exit towards such side when the reflection subunit 204 as shown in FIG. 5 is set.

The control component 104 is configured to conduct a control such that an image corresponding to the first image is rotated by a predetermined angle in a predetermined direction within the particular plane when a predetermined event is detected by the detection component 103, as described above. The control herein may be a control on the display component 101. Or alternatively, the control herein may also be a control on the optical component 102.

Firstly, a case where the display component 101 is controlled by the control component 104 when the predetermined event is detected by the detection component 103 will be described. Particularly, the display component 101 is controlled by the control component 104 so as to output an original light corresponding to a second image when the occurrence of the predetermined event is detected by the detection component 103, the second image being an image resulting from a rotation of the first image by the predetermined angle in the predetermined direction within the display plane of the display component. That is, the image corresponding to the first image may be rotated by the predetermined angle in the predetermined direction within the particular plane by changing the image at the source, i.e., rotating the image at the source.

Subsequently, the case where the optical component 102 is controlled by the control component 104 when the predetermined event is detected by the detection component 103 will be described.

Particularly, the optical component 102 has a first mode and a second mode, and the optical paths corresponding to the first mode and the second mode are different from and exchangeable with each other.

The optical component 102 is controlled by the control component 104 to be in the first mode and conduct an optical path conversion from the original light corresponding to the first image originating from the display component 101 into a first exit light through a first optical path in the first mode when the occurrence of the predetermined event is not detected by the detection component 103, the first exit light being capable of forming an image corresponding to the first image within the particular plane.

On the other hand, the optical component 102 is controlled by the control component 104 to be in a second mode and conduct an optical path conversion from the original light corresponding to the first image originating from the display component 101 into a second exit light through a second optical path in the second mode when the occurrence of the predetermined event is detected by the detection component 103, the second image being an image resulting from a rotation of the first image by the predetermined angle in the predetermined direction within the particular plane.

For example, as a possible implementation, the first optical path in the first mode is the optical path as shown in FIG. 5, and the second optical path in the second mode may be realized by adding a group of lenses at a position where the collimation unit 21 is coupled with the waveguide unit 22 or between the display unit 12 and the splitter unit 13 on the basis of the optical path as shown in FIG. 5. For example, one or more convex lenses may be included in such group of lenses. The image displayed by the light-emitting source, such as the first image, is able to be flipped by 180 degrees by the group of lenses, that is, an upside-down image is formed, when the light-emitting source is placed at a predetermined distance from the group of lenses.

Meanwhile, the group of lenses may be moved outside and into the optical paths in the first mode and the second mode by a particular mechanism respectively. For example, the group of lenses may be moved outside/into the optical paths by the particular mechanical structure. Moreover, for another example, the group of lenses is composed of a deformable cavity and the liquid filled therein; in the first mode, the group of lenses is in a first optical mode, and the deformable cavity is not deformed, such that a first shape is maintained, thereby the light ray is able to pass through the deformable cavity without any influence on the imaging, while in the second mode, the group of lenses is in a second optical mode, and the deformable cavity is deformed to be a second shape, such that the image displayed by the light-emitting source, for example, the first image, is flipped by 180 degrees, that is, an upside-down image is formed. For example, the shape of the deformable cavity may be changed by changing the volume of the filled liquid or an external frame of the deformable cavity.

Of course, the manner by which the optical component exemplified above is switched between the first and the second modes is merely an example. Any other possible implementations may be conceived by those skilled in the art and should be fallen within the scope of the disclosure.

The details for the detection component 103 will be depicted in detail hereinafter.

As a possible implementation, the detection component 103 is a space gesture sensor, such as a gravity sensor, a gyroscope, and so on, and the optical component comprises a visual region through which the user may view the image from the display component 101. It is to be noted herein that the particular plane is not overlapped with the plane in which the visual region is located, since the formed image is an enlarged virtual image as described above. Particularly, the particular plane is located in the opposite side to the user and is at a position which is a predetermined distance away from the visual region. The expression "not overlapped" as stated herein refers to the case where the particular plane and the plane in which the visual region is located are different planes, that is, they are not superposed with each other. In most of cases, the particular plane is a plane parallel to the plane in which the visual region is located.

The space gesture sensor is configured to detect a space gesture of the visual region. The x and y axes of the gravity sensor is set to be coincident with that of the visual region instead of the display region of the display component in the case where the gravity sensor is used as the space gesture sensor, since the detection component 103 is intended to detect the space gesture of the visual region instead of that of the display component 101.

The predetermined event is an event in which a variation in the space gesture of the visual region is detected, and the predetermined direction and angle are set to be a rotation direction and angle indicated by the variation in the space gesture by the control component respectively.

Generally, each of the space gesture sensors in the related art is able to detect merely the space gesture at a particular moment. For example, a first and a second space gestures of the electronic apparatus at a previous first and a next second time points are detected at those time points respectively. At that time, a decision on which whether the electronic apparatus is rotated and a determination of the rotation direction and the rotation angle may be made by comparing the first and the second space gestures with each other. That is, a general space gesture sensor detects the results of the gestures for comparing to determine an amount of the variation. Of course, there may also be a space gesture sensor for detecting the amount of the variation in the space gestures directly, which also should be fallen within the scope of the disclosure.

Or alternatively, as another possible implementation, the detection component 103 is a touch sensor. In such case, a touch sensing region on which a touch action is able to be sensed by the touch sensor is set on the external surface of the electronic apparatus, and the predetermined event is a particular touch action by an operation object. Particularly, the touch region and the visual region are not overlapped with each other for a purpose of a non-blocking of the display for a miniature display unit, such as the LOE. The touch sensing region may be set on the periphery of the visual region as described above. Alternatively, the touch region and the visual region may be blocked partly. Alternatively, the touch region and the visual region may be in a tiled placement, such as a top-bottom or a left-right tiled placement.

The rotation setting function of the control component 104 is that the predetermined direction and angle are set to be a direction and an angle corresponding to a slide trace of the operation object, such as the finger(s), respectively. That is, a movement of the operation object is tracked, the display direction is adjusted, and meanwhile, a display resolution and content may also be varied.

For example, the rotation setting function of the control component 104 may be maintained in an enabled state all along. Of course, for the sake of consideration of saving of the power consumption, as a more preferred implementation, rotation setting function may be enabled by a trigger. For example, a possible trigging manner is that the operation object sustains a contact with the touch sensing region for a predetermined period, for example, 3 s. Thereafter, a slide is made on the touch sensing region while the contact is sustained, in order to conduct a subsequent rotation setting. It can be seen that the operation object may slide without any departing after a long press is made to enable the rotation setting function, resulting in a high operation efficiency of the user.

In addition, the contact herein may be a multi-points touch, and may also be a single-point touch. For the sake of consideration of saving of the power consumption, as a more preferred implementation, the trigging may be trigged by the single-point touch, and the slide of single-point touch may be used to control the rotation after the enabling.

Figure 6A:
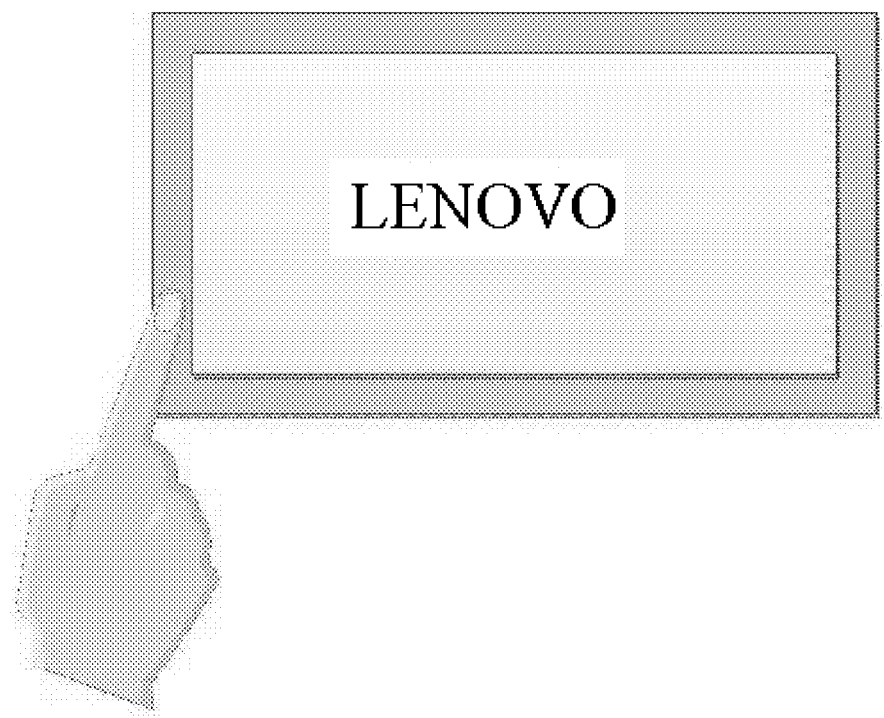
FIGS. 6A-6D illustrate schematic diagrams of a procedure in which a display is rotated based on a slide trace of the finger(s)
Figure 6B:
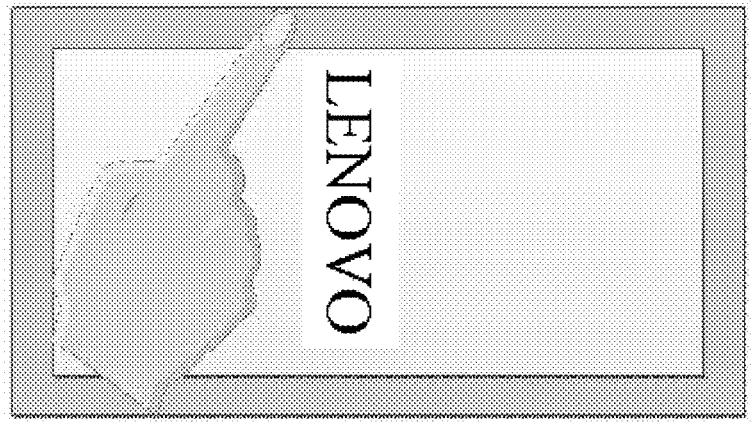
Figure 6C:
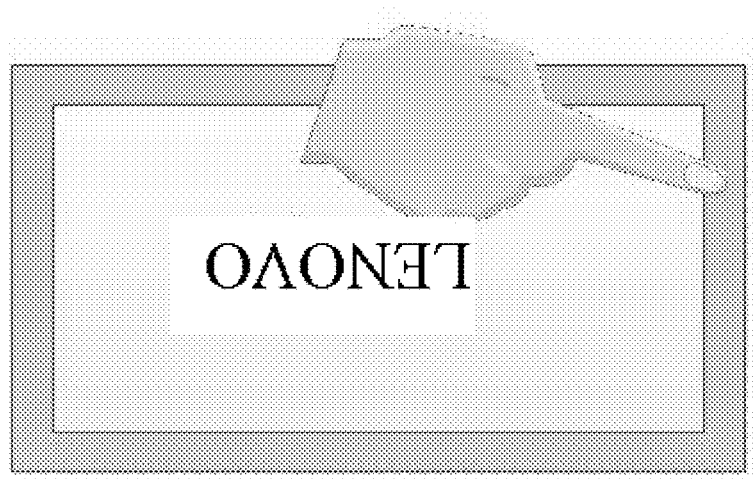
Figure 6D:
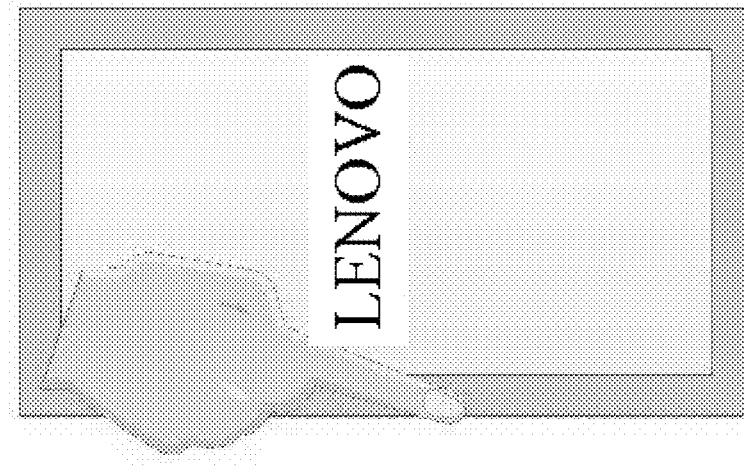

FIGS. 6A-6D illustrate the schematic diagrams of a procedure in which the display is rotated based on the slide trace of the finger(s). The finger(s) is(are) sustained to be contacted with the touch sensing region for a predetermined period firstly, and then the rotation setting function is enabled, as shown in FIG. 6A. Thereafter, the display is rotated along with the movement of the finger(s), as shown in FIGS. 6B-6D.

The electronic apparatus in accordance with the embodiment of the disclosure may be a wearable electronic apparatus. The wearable electronic apparatus are categorized generally into a head-wearable device, such as smart glasses, and a wrist-mounted device, such as smart watch. However, the case where the display are shared with other persons allowing the owner and other persons to view commonly and the case where shared with other persons allowing only the other person to view individually by rotating the device are impossible, when the LOE and POD as described above are applied to the head-wearable device. Therefore, the electronic apparatus in accordance with the embodiment of the disclosure is more particularly the wrist-mounted device, such as the smart watch especially, since the wrist-mounted device is more involved in a scenario of a common or individual share with other persons.

The eyes of the user and other persons who are the object for sharing are required to approach the visual region at the same time, since eyes of the user are required to approach the visual region of the wrist-mounted device in order for a viewing, when the user desires to share the image displayed by such wrist-mounted device commonly with them. Generally, the size of the visual region of the wrist-mounted device is limited; hence it is not possible for two persons to make a simultaneous viewing even though they are closed to each other very tightly.

In view of the scenario above, another manner by which the image displayed by such wrist-mounted device is share individually with other persons is considered. Unlike the case where the simultaneous viewing of two persons is required in the sharing, only one person is allowed to view in the sharing herein. That is, the user provides the wrist-mounted device to other persons who are the object for sharing in order for the viewing without taking off it.

However, in the above wrist-mounted device in accordance with the related art, there is still a problem in which the privacy is unsatisfied and/or the ergonomics status is violated, that is, it is not comfortable, when the sharing with other persons is made. It is assumed that the wrist-mounted device is worn on the left hand of the user in each of the respective cases as described hereinafter. Firstly, it is considered a case where the user is opposite to other persons who are the objects for sharing. At that time, the wrist is merely possible to be flipped by 180 degrees outwardly by the user to provide the visual region to other persons who are the objects for sharing in order for the viewing, however, at that time, the image viewed by other persons who are the objects for sharing is upside-down. The status of the ergonomics may be violated due to the manner by which the wrist is flipped by the user, if it is ensured that the image viewed by other persons who are the objects for sharing on the opposite side is not upside-down. Alternatively, the left arm of the user may be expanded toward the left while the device is not rotated, and then the objects for sharing on the opposite side move closely to the wrist-mounted device on the left arm of the user in order for the viewing. However, the ergonomics status is violated by the action of the arm of the user at that time as well. Secondly, it is considered the case where the user is adjacent to other persons who are the objects for sharing, such as the case where the user is on the right and other persons who are the objects for sharing are on the left. At that time, the wrist is merely possible to be flipped by 180 degrees towards the left by the user to provide the visual region to other persons who are the objects for sharing in order for the viewing, however, at that time, the image viewed by other persons who are the objects for sharing is upside-down. The status of the ergonomics may be violated due to the manner by which the wrist is flipped by the user, if it is ensured that the image viewed by other persons who are the objects for sharing on the opposite is not upside-down. Thirdly, it is considered the case where the user is adjacent to other persons who are the objects for sharing, such as the case where the user is on the left and other persons who are the objects for sharing is on the right. The user has to expand the left arm as much as possible while the device is not rotated, such that the objects for sharing on the right side are able to move closely to the wrist-mounted device on the left arm of the user in order for the viewing. However, the objects for sharing are located in the bosom of the user at that time; in other words, they get close to each other very tightly, such that the privacy is unsatisfied.

However, in the wrist-mounted device in accordance with the embodiment of the disclosure, when the user is to make an individual sharing with other persons, for example, when the electronic apparatus is the wrist-mounted device and the operator thereof makes an individual sharing with other persons on the opposite or left side by flipping the wrist outward or towards left by 180 degrees, the electronic apparatus is rotated at that time, thereby the image corresponding to first image is also rotated accordingly therewith. However, the rotation focused in the disclosure is not a passive one resulting from the rotation of the device, but an active one within the particular plane, i.e., the imaging plane. The picture viewed by other persons who are the objects for sharing is upside-down if there is only such a passive rotation. Therefore, in the disclosure, in addition to the passive rotation, the active rotation is also introduced, such that the picture viewed by other persons who are the objects for sharing is upright. Such passive rotation may merely result in a rotation of the image corresponding to the first image after the rotation of the device with respect to the image corresponding to the first image before the rotation of the device, and a relative angle relationship between the image corresponding to the first image and, for example, the frame of the visual region of the device is not changed before and after the rotation. However, such active rotation may result in a change in the relative angle relationship between the image corresponding to the first image and, for example, the frame of the visual region of the device, i.e., a rotation. Thereby the image viewed by other persons who are the objects for sharing is upright.

With such active rotation, it is possible that the displayed image is rotated more conveniently, promptly and adaptively for the sharing person by a gesture by which the user feels most comfortable while the privacy is taken into account.

Figure 7A:
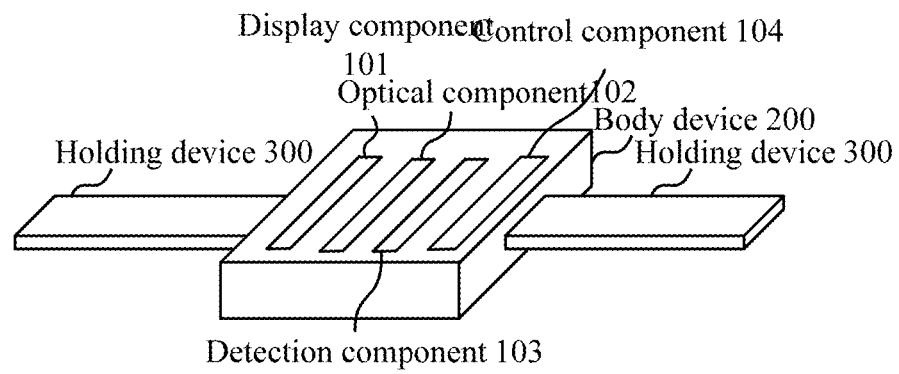
FIGS. 7A-7C illustrate block diagrams of a structure of the electronic apparatus in accordance with the embodiment of the disclosure.
Figure 7B:
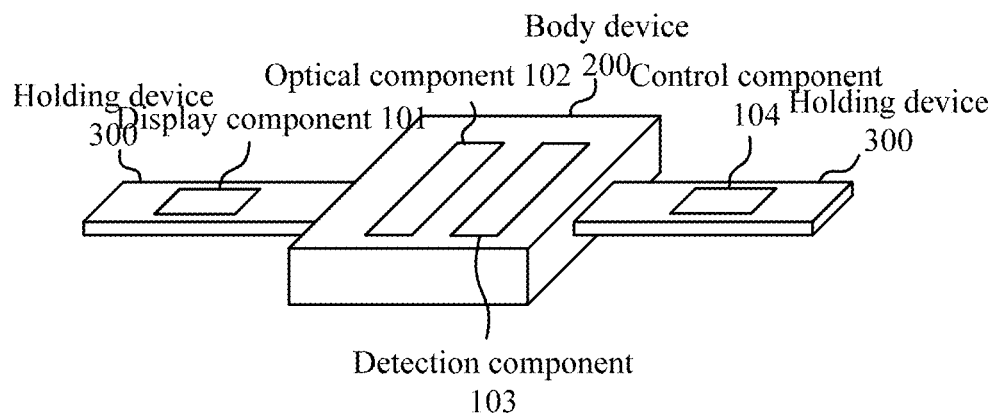
Figure 7C:
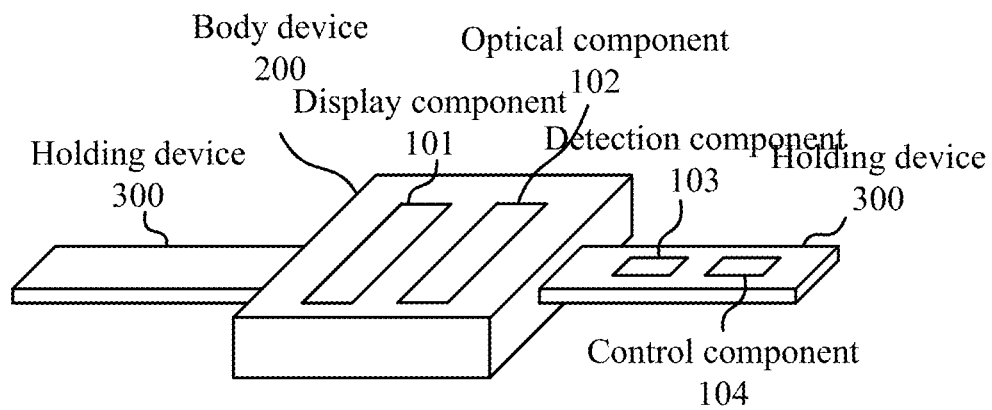

FIGS. 7A-7C illustrate the block diagrams of the structure of the electronic apparatus in accordance with the embodiment of the disclosure. The electronic apparatus 100 in accordance with the embodiment of the disclosure comprises a body device 200 and a holding device 300, as shown in FIGS. 7A-7C. Wherein the holding device 300 is connected with the body device 200, and the holding device 300 is configured to hold a relative position relationship with respect to the operator of the electronic apparatus. Wherein the display component 101 is located in the body device and/or the holding device, the optical component 102 is located in the body device and/or the holding device, the detection component 103 is located in the body device and/or the holding device, and the control component 104 is located in the body device and/or the holding device.

Particularly, FIG. 7A illustrates an example in which all of the display component 101, the optical component 102, the detection component 103, and the control component 104 are located in the body device 200. FIG. 7B illustrates an example in which the display component 101 and the control component 104 are located in the holding device 300, and the optical component 102 and the detection component 103 are located in the body device 200. FIG. 7C illustrates an example in which the display component 101 and the optical component 102 are located in the holding device 300, and the detection component 103 and the control component 104 are located in the body device 200. However, it is to be appreciated by those skilled in the art that there may be any other possible layouts. That is, each of the display component 101, the optical component 102, the detection component 103, and the control component 104 may either located in the body device 200 or the holding device 300.

The first to fourth configuration examples of the holding device will be further described with reference to FIGS. 8A-8D hereinafter. In FIGS. 8A-8D, for sake of simplicity and clearance of the description, only the body device 200 and the holding device 300 in the electronic apparatus 100 are shown.

The holding device comprises at least a holding state in which the holding device is able to be at least one part of one annular space or at least one part of an approximated annular space compliant with a first predetermined condition, the annular or the approximated annular space is able to enclose the periphery of a cylinder compliant with a second predetermined condition. Wherein the approximated annular space herein is a non-closed annular space, that is, there is an opening, and the first predetermined condition is that the opening of the approximated annular space is smaller than the diameter of the wrist of the user, such that it is ensured that there is not a drop due to that non-closed opening of the approximated annular space upon a wear by the user. The second predetermined condition is that the diameter of the cylinder is larger than that of the wrist and smaller than that of the first of the user.

Figure 8A:
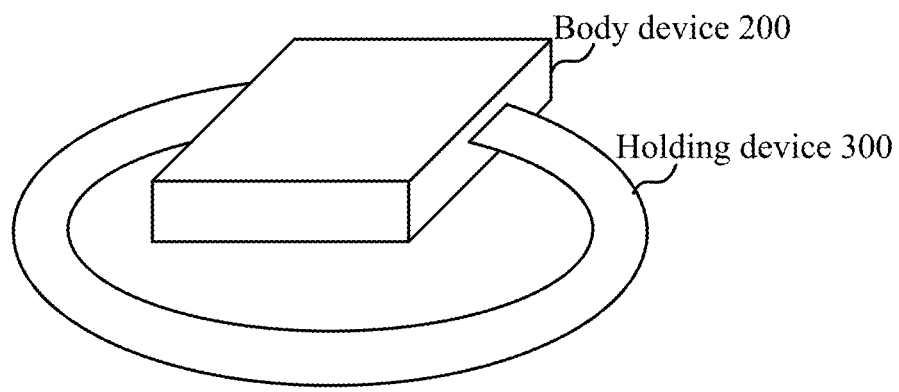
FIGS. 8A-8D illustrate a first example to a fourth example of configurations of a holding device.
Figure 8B:
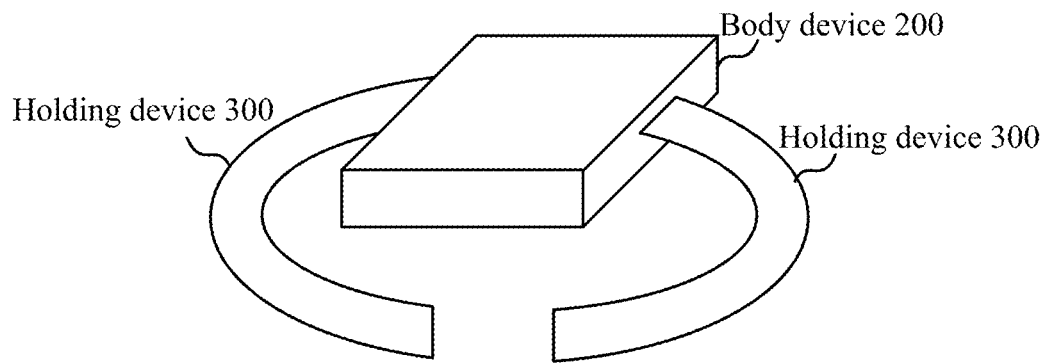

Particularly, FIGS. 8A and 8B illustrate two holding states in which the holding device 300 is connected with the body device 200 respectively. In the first holding state as shown in FIG. 8A, an annular space which is a closed loop is formed from the holding device 300 and the body device 200, wherein the holding device 300 and the body device 200 is composed of a part of the annular space respectively. In the second holding state as shown in FIG. 8B, an approximated annular space with a minor opening is formed from the holding device 300 and the body device 200, wherein the holding device 300 and the body device 200 are composed of a part of the annular space respectively. In one preferred embodiment of the disclosure, the body device 200 and the holding device 300 are a dial and strap portions of the smart watch respectively. The periphery of the wrist of the user of the smart watch which is the cylinder is capable of being surrounded by the annular or the approximated annular space formed from the body device 200 and the holding device 300, and the diameter of the annular or the approximated annular space is larger than that of the wrist and smaller than that of the first of the user.

Figure 8C:
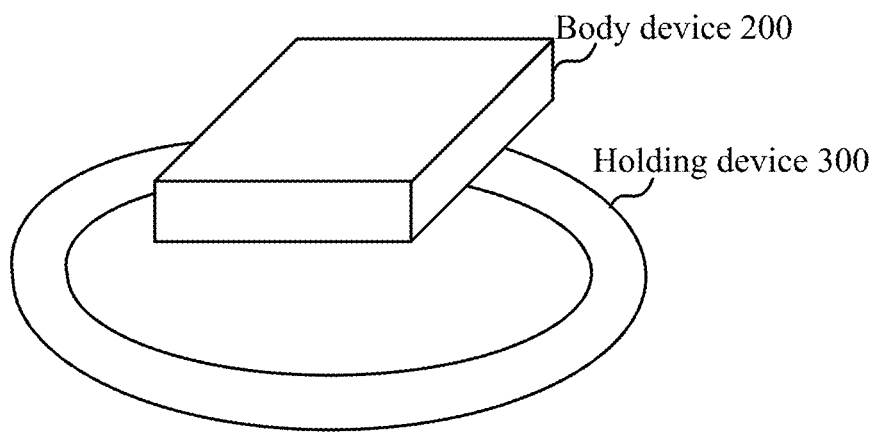
Figure 8D:
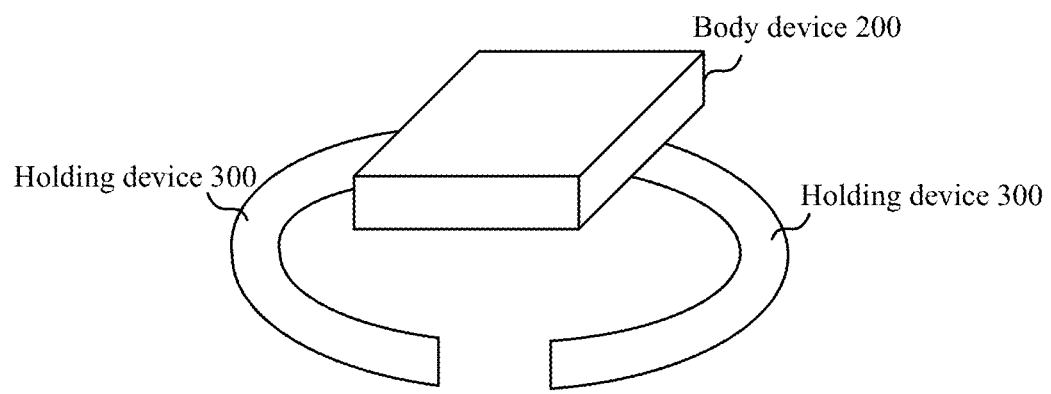

Moreover, the annular or the approximated annular space may, of course, be formed from the holding device 300 alone. As shown in FIGS. 8C and 8D, the body device 200 may be arranged on the holding device 300, that is, the body device 200 is attached to the holding device 300 by a surface contact manner, such that the annular space (FIG. 8C) or the approximated annular space (FIG. 8D) for surrounding the cylinder externally is merely formed from the holding device 300 itself. The holding device 300 is arranged with a holding mechanism (not shown), such as a hasp, a snap, a zip, and the like.

Or alternatively, as another possible implementation, the detection component 103 is a biometric detection sensor placed internal to the annular space and configured to detect a particular action of the operator. For example, the biometric detection sensor may be a biological electromyography sensor configured to detect an electric signal resulting from a muscle action, such as a first grasping, such that the muscle actions are distinguished from each other.

Wherein the predetermined event is that the particular action of the operator is detected, and the predetermined direction and angle are set to be a preset direction and angle by the control component 104 respectively.

The electronic apparatus in accordance with the embodiment of the disclosure is described in detail with reference to FIGS. 1 to 8D hereinabove.

The display device in accordance with the embodiment of the disclosure will be described herein below. The display device is contained within the electronic apparatus. The display device comprises a display component for outputting an original light corresponding to a first image; an optical component at least partly set within an illumination region of the original light and configured for conducting an optical path conversion from the original light corresponding to the first image originating from the display component into a first exit light capable of forming an enlarged virtual image corresponding to the first image in a particular plane at a particular position. Wherein the display component or the optical component is capable of being controlled, such that an image corresponding to the first image is rotated by the predetermined angle in a predetermined direction on the particular plane when the occurrence of the predetermined event is detected.

The control herein may be a control on the display component. Or alternatively, the control herein may also be a control on the optical component.

Firstly, a case where the display component is controlled by the control component when a predetermined event is detected will be described. Particularly, the display component is controlled so as to output an original light corresponding to a second image when the occurrence of the predetermined event is detected, and the second image is an image resulting from a rotation of the first image by the predetermined angle in the predetermined direction within the display plane of the display component. That is, the image corresponding to the first image may be rotated by the predetermined angle in the predetermined direction within the particular plane by changing the image at the source, i.e., rotating the image at the source.

Subsequently, a case where the optical component is controlled when the predetermined event is detected will be described.

Particularly, the optical component has a first mode and a second mode, and the optical paths corresponding to the first mode and the second mode are different from and exchangeable with each other.

The optical component is controlled to be in the first mode when the occurrence of the predetermined event is not detected, an optical path conversion is conducted from the original light corresponding to the first image originating from the display component into a first exit light through the first optical path in the first mode, and the first exit light is capable of forming an image corresponding to the first image within the particular plane.

On the other hand, the optical component is controlled to be in a second mode when the occurrence of the predetermined event is detected, an optical path conversion is conducted from the original light corresponding to the first image originating from the display component into a second exit light through a second optical path in the second mode, and the second exit light is capable of forming an image corresponding to the second image within the particular plane, the second image is an image resulting from a rotation of the first image by the predetermined angle in the predetermined direction within the particular plane.

For example, as a possible implementation, the first optical path in the first mode is the optical path as shown in FIG. 5, and the second optical path in the second mode may be realized by adding a group of lenses at a position where the collimation unit 21 is coupled with the waveguide unit 22 or between the display unit 12 and the splitter unit 13 on the basis of the optical path as shown in FIG. 5. For example, one or more convex lenses may be included in such group of lenses. The group of lenses is capable of flipping the image displayed by the light-emitting source, for example, the first image, by 180 degrees, that is, an upside-down image is formed.

Meanwhile, the group of lenses may be moved outside and into the optical path in the first mode and the second mode by a particular mechanism respectively. For example, the group of lenses may be moved outside/into the optical path by the particular mechanical structure. Moreover, for another example, the group of lenses is composed of a deformable cavity and the liquid filled therein. In the first mode, the group of lenses is in a first optical mode, and the deformable cavity is not deformed, such that a first shape is maintained, thereby the light ray is able to pass through the deformable cavity without any influence on the imaging, while in the second mode, the group of lenses is in a second optical mode, and the deformable cavity is deformed to be a second shape, such that the image displayed by the light-emitting source, for example, the first image is flipped by 180 degrees, that is, an upside-down image is formed. For example, the shape of the deformable cavity may be changed by changing the volume of the filled liquid or an external frame of the deformable cavity.

Of course, the manner by which the optical component exemplified above is switched between the first and the second modes is merely an example. Any other possible implementations may be conceived by those skilled in the art and fallen within the scope of the disclosure.

Figure 9:
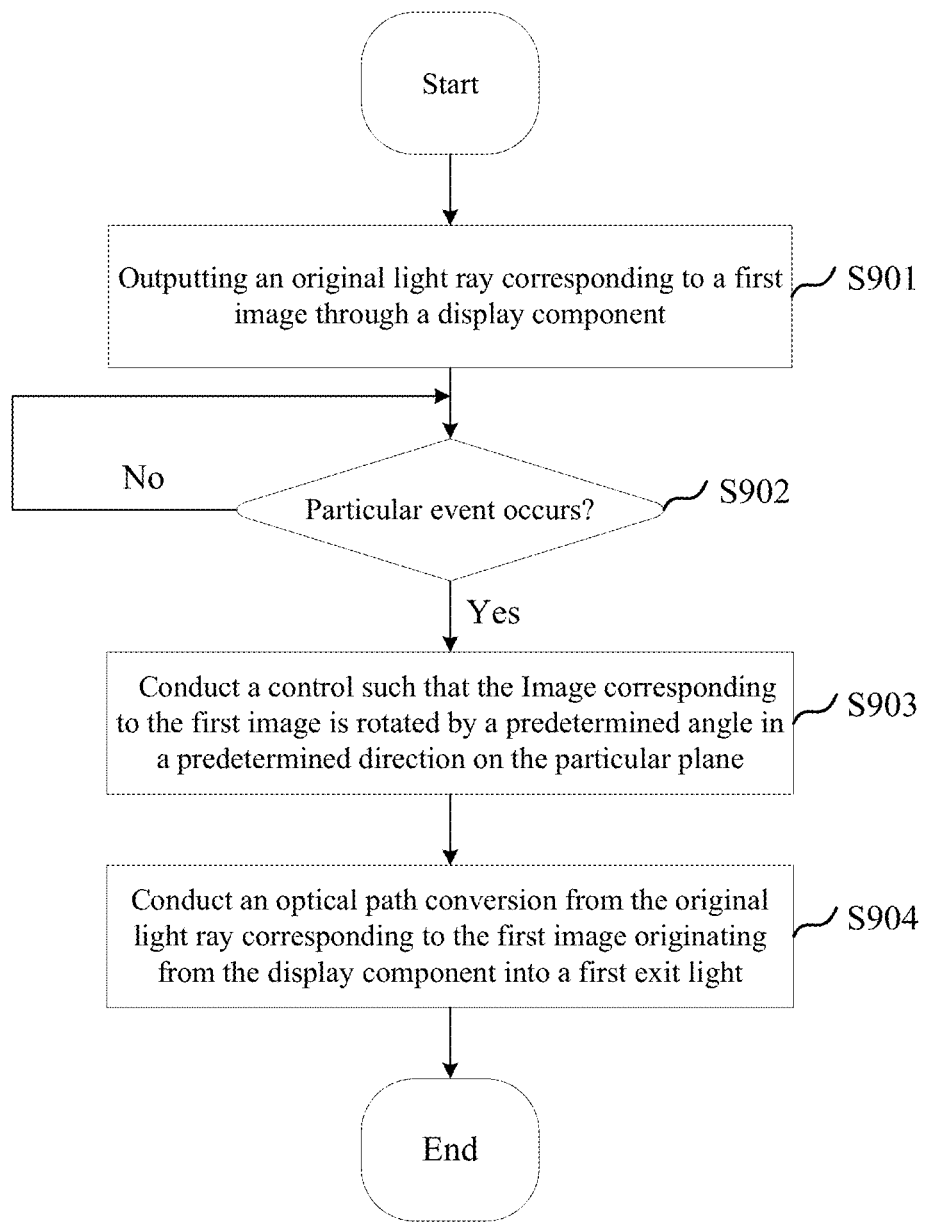
FIG. 9 is a flowchart illustrating a procedure of a display control method in accordance with the embodiment of the disclosure.

Finally, a flow of the display control method in accordance with the embodiment of the disclosure will be described with reference to FIG. 9. As shown in FIG. 9, the method comprises:

Firstly, an original light corresponding to a first image is output by a display component in step S901.

Sequentially, an optical path conversion is conducted from the original light corresponding to the first image originating from the display component into a first exit light by an optical component in step S902, and the first exit light is capable of forming an enlarged virtual image corresponding to the first image within the particular plane at a particular position.

Next, an occurrence of a predetermined event is detected in step S903. The process proceeds into step S904, if the decision is positive in step S903. On the other hand, the step S903 is repeated after a predetermined duration is elapsed, if the decision in step S903 is negative.

In step S904, that is, when the occurrence of the predetermined event is detected, a control is made such that the image corresponding to the first image is rotated by a predetermined angle in a predetermined direction on the particular plane.

The control herein may be a control on the display component. Or alternatively, the control herein may also be a control on the optical component.

Firstly, a case where the display component is controlled by the control component when a predetermined event is detected will be described. Particularly, the display component is controlled so as to output an original light corresponding to a second image when an occurrence of the predetermined event is detected, and the second image is an image resulting from a rotation of the first image by the predetermined angle in the predetermined direction within the display plane of the display component. That is, the image corresponding to the first image may be rotated by the predetermined angle in the predetermined direction within the particular plane by changing the image at the source, i.e., rotating the image at the source.

Subsequently, a case where the optical component is controlled when the predetermined event is detected will be described.

Particularly, the optical component has a first mode and a second mode, and the optical paths corresponding to the first mode and the second mode are different from and exchangeable with each other.

The optical component is controlled to be in the first mode when the occurrence of the predetermined event is not detected, an optical path conversion is conducted from the original light corresponding to the first image originating from the display component into a first exit light through the first optical path in the first mode, and the first exit light is capable of forming an image corresponding to the first image within the particular plane.

On the other hand, the optical component is controlled to be in a second mode when the occurrence of the predetermined event is detected, an optical path conversion is conducted from the original light corresponding to the first image originating from the display component into a second exit light through a second optical path in the second mode, and the second exit light is capable of forming an image corresponding to the second image within the particular plane, the second image is an image resulting from a rotation of the first image by the predetermined angle in the predetermined direction within the particular plane.

For example, as a possible implementation, the first optical path in the first mode is the optical path as shown in FIG. 5, and the second optical path in the second mode may be realized by adding a group of lenses at a position where the collimation unit 21 is coupled with the waveguide unit 22 or between the display unit 12 and the splitter unit 13 on the basis of the optical path as shown in FIG. 5. For example, one or more convex lenses may be included in such group of lenses. The group of lenses is capable of flipping the image displayed by the light-emitting source, for example, the first image, by 180 degrees, that is, an upside-down image is formed.

Meanwhile, the group of lenses may be moved outside and into the optical path in the first mode and the second mode by a particular mechanism respectively. For example, the group of lenses may be moved outside/into the optical path by the particular mechanical structure. Moreover, for another example, the group of lenses is composed of a deformable cavity and the liquid filled therein. In the first mode, the group of lenses is in a first optical mode, and the deformable cavity is not deformed, such that a first shape is maintained, thereby the light ray is able to pass through the deformable cavity without any influence on the imaging, while in the second mode, the group of lenses is in a second optical mode, and the deformable cavity is deformed to be a second shape, such that the image displayed by the light-emitting source, for example, the first image is flipped by 180 degrees, that is, an upside-down image is formed. For example, the shape of the deformable cavity may be changed by changing the volume of the filled liquid or an external frame of the deformable cavity.

Of course, the manner by which the optical component exemplified above is switched between the first and the second modes is merely an example. Any other possible implementations may be conceived by those skilled in the art and fallen within the scope of the disclosure.

The electronic apparatus, the display device, and the display control method in accordance with the embodiment of the disclosure are described in detail with reference to FIGS. 1 to 9 heretofore. With the electronic apparatus, the display device, and the display control method in accordance with the embodiment of the disclosure, the display content may be rotated conveniently and promptly by a gesture by which the user feels most comfortable while a privacy is taken into account upon the device is shared individually with other persons, such that the user experience may be improved greatly.

It is to be stated that the terms "comprise", "include" or any other variants in the specification is intended to encompass a non-exclusive inclusion, such that the process, method, article, or device comprising a series of elements includes not only those elements but also other ones not exemplified explicitly, or further includes the elements inherent to that process, method, article, or device. The elements defined by the phrase "include . . . " never excludes a further existence of other same elements in the inclusion of the process, method, article, or device without any further limitation.

Finally, it is to be stated that a series of processes above includes not only the processes performed in a time sequence in the order herein, but also those performed in parallel or separately instead of the time order.

It is appreciated by those skilled in the art that the disclosure may be implemented by means of software plus essential hardware platform, and may also be implemented by software entirely through the implementations as described above. Based on such appreciation, all or part of the contribution to the related art made by the solution of the disclosure may be embodied by a form of a software product which may be stored in a storage medium, such as a ROM/RAM, a magnetic disk, an optical disk, and so on, including several instructions having a computer device, which may be a personal computer, a server, or a network device, etc., execute the method of respective embodiment s or some parts of the embodiment s of the disclosure.

The detailed description has been made on the disclosure hereinabove, and the principle of the disclosure and the implementations thereof is set forth by applying particular examples in the context, the illustration of the embodiment s above is merely intended for an aid of understanding of the method of the disclosure and the core concept thereof; meanwhile, for the skilled in the art, there may be alternation on the specific implementations and the application scope in light of the concept of the disclosure, and in summary the specification will not be construed to be any limitation to the disclosure.

The invention claimed is:

1. An electronic apparatus comprising:
   a display for outputting an original light corresponding to a first image;
   an optical path converter configured for transforming the original light to a first exit light by conducting an optical path conversion on the original light, wherein the first exit light is capable of forming an enlarged virtual image corresponding to the first image within an imaging plane wherein the optical path converter includes a group of lenses for collimating and enlarging the first image;
   a detector configured for detecting whether a predetermined event occurs; and
   a controller configured for controlling a rotation within the imaging plane of the enlarged virtual image in the case that the predetermined event is detected, wherein
   the optical path converter has a first mode and a second mode, and the optical paths corresponding to the first mode and the second mode are different from and exchangeable with each other;
   the optical path converter is controlled by the controller to be in a first mode in the case that the occurrence of the predetermined event is not detected by the detector, so as to conduct an optical path conversion from the original light corresponding to the first image originating from the display into a first exit light through the first optical path in the first mode, and the first exit light is capable of forming an image corresponding to the first image within the imaging plane, and
   the optical path converter is controlled by the controller to be in a second mode in the case that the occurrence of the predetermined event is detected by the detector, so as to conduct the optical path conversion from the original light corresponding to the first image originating from the display into a second exit light through a second optical path in the second mode, and the second exit light is capable of forming an image corresponding to a second image within the imaging plane, and the second image is an image resulting from a rotation of the first image by a predetermined angle in the predetermined direction within the imaging plane.

2. The electronic apparatus of claim 1, wherein the rotation is a rotation by a predetermined angle in a predetermined direction.

3. The electronic apparatus of claim 1, wherein an exit direction of the original light is different from that of the first exit light.

4. The electronic apparatus of claim 1, wherein the display is controlled by the controller so as to output an original light corresponding to a second image in the case that an occurrence of the predetermined event is detected by the detector, and the second image is an image resulting from a rotation of the first image by a predetermined angle in a predetermined direction within the display plane of the display.

5. The electronic apparatus of claim 1, wherein the detector is a space gesture sensor, and the optical path converter comprises a visual region, the space gesture sensor being configured for detecting a space gesture of the visual region, and wherein the predetermined event is a detection of a variation in the space gesture of the visual region, and a rotation direction and angle indicated by the variation in the space gesture is set to be a predetermined direction and angle by the controller.

6. The electronic apparatus of claim 1, wherein the imaging plane is not overlapped with a plane in which the visual region is located.

7. The electronic apparatus of claim 1, wherein the detector is a touch sensor capable of sensing a touch action on a touch sensing region set on an external surface of the electronic apparatus and the predetermined event is a particular touch action by an operation object.

8. The electronic apparatus of claim 7, wherein a predetermined direction and angle are set to be a direction and angle corresponding to a slide trace of the operation object by the controller.

9. The electronic apparatus of claim 1, further comprising:
a body; and
a holder which is connected with the body for holding a relative position relationship of the electronic apparatus with respect to an operator,
wherein the display is located in the body and/or the holder, the optical path converter is located in the body and/or the holder, the detector is located in the body and/or the holder, and the controller is located in the body and/or the holder.

10. The electronic apparatus of claim 9, wherein the holder comprises at least a holding state in which the holder is capable of being at least part of an annular space or an approximated annular space satisfying a first predetermined condition, and a periphery of a cylinder satisfying a second predetermined condition is capable of being surrounded by the annular or the approximated annular space.

11. The electronic apparatus of claim 10, wherein the detector is a biometric detection sensor placed internal to the annular space and configured for detecting a particular action of the operator, wherein the predetermined event is the detection of the particular action of the operator and the predetermined direction and angle are set to be a preset direction and angle by the controller.

12. A display device comprising:
a display for outputting an original light corresponding to a first image;
an optical path converter configured for transforming the original light to a first exit light by conducting an optical path conversion on the original light, wherein the first exit light is capable of forming an enlarged virtual image corresponding to the first image in an imaging plane, wherein the optical path converter includes a group of lenses for collimating and enlarging the first image;

wherein the display or the optical path converter is capable of being controlled such that a rotation within the imaging plane of the enlarged virtual image is controlled in the case that an occurrence of a predetermined event is detected;
the optical path converter has a first mode and a second mode, and the optical paths corresponding to the first mode and the second mode are different from and exchangeable with each other;
the optical path converter is controlled by the controller to be in a first mode in the case that the occurrence of the predetermined event is not detected by the detector, so as to conduct an optical path conversion from the original light corresponding to the first image originating from the display into a first exit light through the first optical path in the first mode, and the first exit light is capable of forming an image corresponding to the first image within the imaging plane,
the optical path converter is controlled by the controller to be in a second mode in the case that the occurrence of the predetermined event is detected by the detector, so as to conduct the optical path conversion from the original light corresponding to the first image originating from the display into a second exit light through a second optical path in the second mode, and the second exit light is capable of forming an image corresponding to a second image within the imaging plane, and the second image is an image resulting from a rotation of the first image by a predetermined angle in the predetermined direction within the imaging plane.

13. The display device of claim 12, wherein the rotation is a rotation by a predetermined angle in a predetermined direction.

14. A display control method comprising:
outputting an original light corresponding to a first image by a display;
transforming the original light to a first exit light by conducting an optical path conversion on the original light for collimating and enlarging the first image, wherein the first exit light is capable of forming an enlarged virtual image corresponding to the first image in an imaging plane by an optical path converter;
detecting whether a predetermined event occurs; and
controlling a rotation within the imaging plane of the enlarged virtual image in the case that the occurrence of the predetermined event is detected wherein
there is a first mode and a second mode, and the optical paths corresponding to the first mode and the second mode are different from and exchangeable with each other;
controlling to be in a first mode in the case that the occurrence of the predetermined event is not detected by the detector, so as to conduct an optical path conversion from the original light corresponding to the first image originating from the display into a first exit light through the first optical path in the first mode, and the first exit light is capable of forming an image corresponding to the first image within the imaging plane,
controlling to be in a second mode in the case that the occurrence of the predetermined event is detected by the detector, so as to conduct the optical path conversion from the original light corresponding to the first image originating from the display into a second exit light through a second optical path in the second mode, and the second exit light is capable of forming an image corresponding to a second image within the imaging plane, and the second image is an image resulting from a rotation of the first image by a predetermined angle in the predetermined direction within the imaging plane.

15. The display control method of claim 14, wherein the rotation is a rotation by a predetermined angle in a predetermined direction.

\* \* \* \* \*